United States Patent

Aeschbach et al.

Patent Number: 5,795,609
Date of Patent: Aug. 18, 1998

[54] ALKYLENE GLYCOL EXTRACTION OF ANTIOXIDANTS FROM VEGETABLE MATTER

[75] Inventors: Robert Aeschbach, Vevey; Patricia Rossi, La Tour-De-Peilz, both of Switzerland

[73] Assignee: Nestec S.A., Vevey, Switzerland

[21] Appl. No.: 603,641

[22] Filed: Feb. 20, 1996

[30] Foreign Application Priority Data

Feb. 21, 1995 [EP] European Pat. Off. ............ 95102439
Nov. 28, 1995 [EP] European Pat. Off. ............ 95203264

[51] Int. Cl.$^6$ ............................................ A23D 9/06
[52] U.S. Cl. ....................... 426/542; 426/541; 424/401; 514/937
[58] Field of Search ............................ 426/541, 542

[56] References Cited

U.S. PATENT DOCUMENTS

| | | | |
|---|---|---|---|
| 2,571,948 | 10/1951 | Sair | 426/650 |
| 3,950,266 | 4/1976 | Chang et al. | 252/398 |
| 4,877,635 | 10/1989 | Todd, Jr. | 426/542 |
| 5,209,870 | 5/1993 | Todd, Jr. | 252/398 |
| 5,433,949 | 7/1995 | Kahleyss et al. | 424/195.1 |
| 5,492,709 | 2/1996 | Aeschbach et al. | 426/542 |
| 5,585,130 | 12/1996 | Aeschbach et al. | 426/542 |

FOREIGN PATENT DOCUMENTS

| | | |
|---|---|---|
| 1124192 | 2/1992 | Australia. |
| 2117409 | 2/1995 | Canada. |
| 2160211 | 12/1985 | United Kingdom. |
| WO9001271 | 2/1990 | WIPO. |

*Primary Examiner*—Richard L. Raymond
*Attorney, Agent, or Firm*—Vogt & O'Donnell, LLP

[57] ABSTRACT

Antioxidant substances are obtained from vegetable matter by mixing vegetable matter containing antioxidant substances with a $C_2$–$C_6$ alkylene glycol and subjecting the mixture to pressure of at least 40 bar to obtain a liquid extract. In carrying out the process, the vegetable matter mixed with the alkylene glycol has a moisture content of from 5% to 30% by weight. Further, to subject the mixture to pressure, the mixture is pressed, and additionally, the process includes filtering the extract to obtain a clear extract.

18 Claims, 1 Drawing Sheet

ALKYLENE GLYCOL EXTRACTION OF ANTIOXIDANTS FROM VEGETABLE MATTER

BACKGROUND OF THE INVENTION

The present invention concerns a process for the extraction of antioxidants from vegetable matter with the aid of an $C_2$–$C_6$ alkylene glycol by pressing.

Various processes are known for the extraction of antioxidants from vegetable matter. PCT International Application No. WO90/01271 describes, among others, a process for the extraction of antioxidants. It consists of a process for the hot extraction and/or treatment of extracts of vegetable and/or animal origin, rich in vitamins, aromas and substances having antioxidant activity. This hot extraction and/or treatment process comprises several stages and the application of many optional conditions, one of which in particular is the possible use of 1,2-propylene glycol as an extraction solvent.

SUMMARY OF THE INVENTION

The present invention aims at providing a process for the extraction of antioxidants from vegetable matter with a selected vehicle and under special conditions such that it is possible to obtain antioxidants easy to incorporate into aqueous media and emulsions.

The present invention enables a wider spectrum of antioxidant compounds to be obtained during extraction, compared with those that would have been extracted formerly. Indeed, for example, when rosemary antioxidants are extracted by pressing with propylene glycol, according to the present invention, rosmarinic acid is mainly extracted, in addition to carnosol and carnosic acid.

With this purpose in mind, the present process for the extraction of antioxidants from vegetable matter is characterized in that the vegetable matter having a total water content of 5 to 30% by weight, is mixed with an $C_2$–$C_6$ alkylene glycol and that the whole is subjected to a pressure greater than or equal to 40 bar for obtaining a liquid extract containing antioxidant substances which were contained in the vegetable matter, and the present invention includes subjecting the alkylene glycol and vegetable matter mixture to pressure by pressing and includes filtering to obtain a clear liquid.

To obtain a total water content of 5 to 30% by weight, it is possible, optionally, to add a little water, in particular 5 to 15% by weight of water, to the starting vegetable matter.

DETAILED DESCRIPTION OF THE INVENTION

Figure 1:
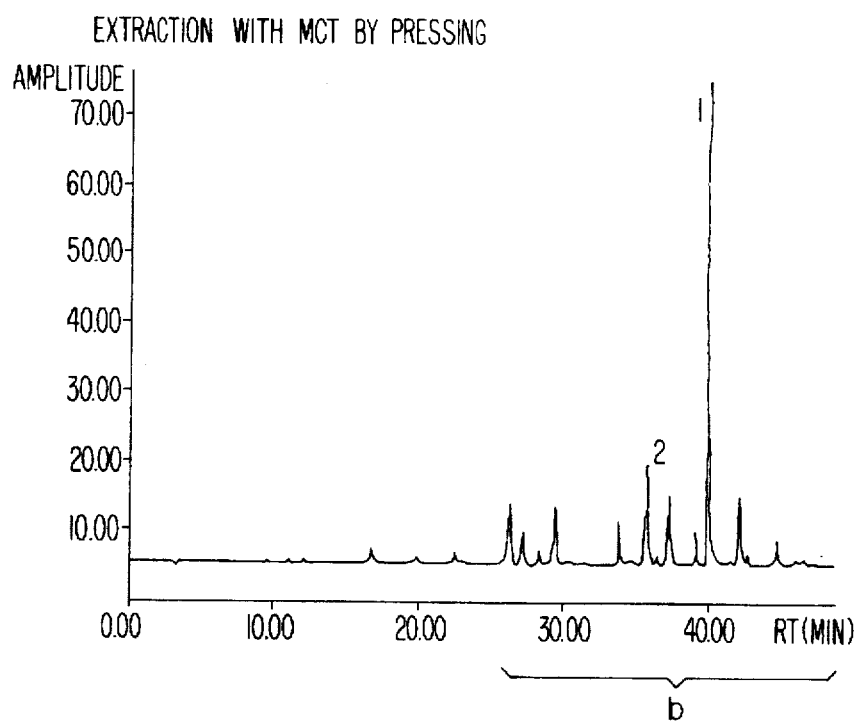

In carrying out the process of the present invention, as the starting vegetable matter, any spice containing antioxidants may be used, alone or as a mixture, in particular rosemary, sage, thyme, marjoram and cloves, and any plant containing antioxidants, in particular, green tea, coffee, potato peelings and tomato skins may be used. The starting vegetable matter may be fresh, whole or more or less finely ground. It may be stripped with steam to remove the major part of the principal odorous substances which are undesirable for certain applications in which the antioxidants are required to be as neutral as possible. In other cases, the desire is to keep at least part of the odorous substances in the liquid antioxidants and the starting vegetable matter is not then stripped. It is preferably in the dry form, whether or not ground and whether or not stripped.

The $C_2$–$C_6$ alkylene glycol used as the vehicle, is preferably glycol, 1,2-propylene glycol or 1,3-butylene glycol.

The starting vegetable matter is preferably first mixed with $C_2$–$C_6$ alkylene glycol at a temperature of 70°–100° C.

The starting vegetable matter may also be mixed with an $C_2$–$C_6$ alkylene glycol at room temperature, for example at 20° C., so as to retain at least part of the odorous substances in the starting vegetable matter.

Preferably, the $C_2$–$C_6$ alkylene glycol is mixed with the starting vegetable matter in a weight ratio of 0.5 to 2.

A first extraction may be made with medium chain triglycerides ("MCT"), that is to say with the aid of a mixture of triglycerides having an average chain length of $C_6$–$C_{12}$, so as to extract only part of the antioxidants, that is to say the liposoluble antioxidants, contained in the starting vegetable matter, this extraction being carried out by pressing which provides an extract and a vegetable matter cake. A second extraction may then be carried out, according to the present invention on the cake from the first pressing, so as to isolate the remaining antioxidants. In point of fact, for example in the case of rosemary, mainly carnosol and carnosic acid can be extracted, during a first extraction with MCT. The starting rosemary leaves may then be recycled and a second extraction carried out, with 1,2-propylene glycol, so as to isolate mainly rosmarinic acid.

An enzyme pretreatment of the vegetable matter may be provided, so as to increase the extraction yield, by incubating the vegetable matter with a glucanase in an aqueous medium and then filtering or centrifuging the suspension to obtain the vegetable matter thus treated, which then is dried. In point of fact, in the case of rosemary, for example, the extraction yield can be increased from 20 to 30% by carrying out an enzyme pretreatment with 1% by weight of a glucanase, at about 40° C. with stirring for about 4 h. The treated vegetable matter is then filtered or centrifuged off before drying.

With the aim of enriching the antioxidants extract without losing too much of the vehicle, a first extraction of antioxidants may be made according to the present invention, and the clear liquid thus collected is then put back again in the presence of a new charge of vegetable matter. This operation may be repeated several times.

After having mixed, with stirring, the starting vegetable matter, the total water content of which is 5 to 30% by weight, with $C_2$–$C_6$ alkylene glycol, the whole is subjected to a pressure greater than or equal to 40 bar. Preferably, for pressing, a piston press is used provided with a filtering cage, of the CARVER type, so as to press and filter in a single stage.

The invention also concerns a process for the protection of a nutritional, cosmetic or pharmaceutical emulsion, characterized in that an effective quantity of extracts of antioxidants of vegetable origin obtained according to the present invention are incorporated into the emulsion.

EXAMPLES

The process according to the present invention is described in greater detail in the following non-limiting examples, in which the parts and percentages are by weight, unless stated to the contrary.

Examples 1–5

100 g of 1,2-propylene glycol were added to 100 g of vegetable matter, chopped and unstripped. The whole was left for 60 min at 80° C. with stirring.

The mixture was pressed in a piston press, of the CARVER type, at 500 bar for 60 min.

A clear liquid was collected containing antioxidants. The RANCIMAT test at 110° C. in various fats and oils and the oxygen electrode method at 30° C. in various oils gave the antioxidant power in the form of the induction indices shown in Table 1.

The induction index is defined as being the ratio: induction time (sample+oil)/induction time (oil)

In examples 1 to 5, rosemary, sage, thyme and marjoram, without any added water, and green tea humidified with 10% water were used, respectively, as the starting vegetable matter.

Oxidation test: oxygen electrode at 30° C.

An emulsion was prepared by mixing 5% of oil and the indicated % of antioxidants with respect to the oil in a buffer solution of pH 7 (No. 9477, Merck, Darmstadt, Germany) with 0.1% of emulsifier using vigorous stirring under nitrogen for 30 min, emulsifying by 6 consecutive passes at 30° C. in an H 5000 microfluidizer.

The stability of the emulsion to oxidation was then measured with the aid of a TRI OX EO 200 electrode coupled to an OXI 530 oxygen meter.

A period of 5 to 10 min was allowed to elapse until the saturation oxygen percentage had a constant value.

This measurement was carried out at 30° C. in a closed vessel, after addition of 5 ml of Haemin catalyst (Fluka AG, Buchs, CH) to 100 ml of emulsion. The Haemin catalyst was prepared from 52 mg of Haemin solution in 100 ml of water, to which 8 drops of 10% KOH were added.

The induction time represented the time in hours for total absorption of dissolved oxygen.

RANCIMAT oxidation test at 110° C.

The sample was placed in a closed reactor.

The sample was heated to 110° C. and was saturated with oxygen from the air introduced into the reactor.

During oxidation, the reactor was itself connected by a flexible tube to a receiver containing distilled water in which a platinum electrode was immersed.

The volatile compounds brought about an increase in conductivity.

The conductivity was measured and the induction periods were calculated.

The induction time was determined graphically from a curve drawn of conductivity as a function of time by the intersection of the tangent to the curve with the time axis.

TABLE 1

For the RANCIMAT test, measurements were made in the presence of 1% of extract based on maize oil, based on chicken fat, or based on soya oil.
For the oxygen electrode test, measurements were carried out in the presence of 1% of extract, either based on the maize oil contained in the emulsion, or based on soya oil contained in the emulsion.

| | | RANCIMAT test/110° C. | | | Oxygen electrode test/30° C. | |
|---|---|---|---|---|---|---|
| Examples | Extracts | Chicken fat | Maize oil | Soya oil | Maize oil | Soya oil |
| 1 | Rosemary | 7.5 | 1.5 | 1.9 | 15.8 | 14.9 |
| 2 | Sage | 5.8 | 1.4 | 1.6 | 6.8 | 4.4 |
| 3 | Thyme | 4.8 | 1.1 | 1.3 | 4.8 | 3 |
| 4 | Marjoram | 2.6 | 1.1 | 1.3 | 4.3 | 3.1 |
| 5 | Green tea | 4.8 | — | — | 16 | — |

— not measured

Measurements of antioxidant power, indicated in the form of an induction index in the oxygen electrode test, demonstrated the quality and stability to oxidation of the antioxidant compounds in emulsion, in relation to the results obtained with an oil in the RANCIMAT oxidation test.

It was quite surprising to obtain an induction index in emulsion much greater than that obtained with the oil.

Comparative Example

As a comparison, extraction of antioxidants from rosemary was carried out on the one hand with 1,2-propylene glycol by pressing, and on the other hand, extraction of antioxidants from rosemary was carried out with MCT by pressing, and a comparison was then made of the spectrum obtained with one or other of the extractions, using high performance liquid chromatography (HPLC).

1) 50 g of 1,2-propylene glycol were added to 100 g of chopped and steam stripped rosemary leaves, the whole was left with stirring for 60 min at room temperature, the mixture was pressed in a piston press of the CARVER type at 500 bar for 60 min, and a clear liquid was then collected containing antioxidants.

HPLC was carried out on a sample of the said liquid.

2) 50 g of MCT were added to 100 g of chopped and steam stripped rosemary leaves, and the whole was left with stirring at 100° C. for 60 min. The mixture was pressed in a piston press of the CARVER type at 500 bar for 60 min, and a clear oil was then collected containing antioxidants.

HPLC was carried out on a sample of the said oil.

Figure 2:
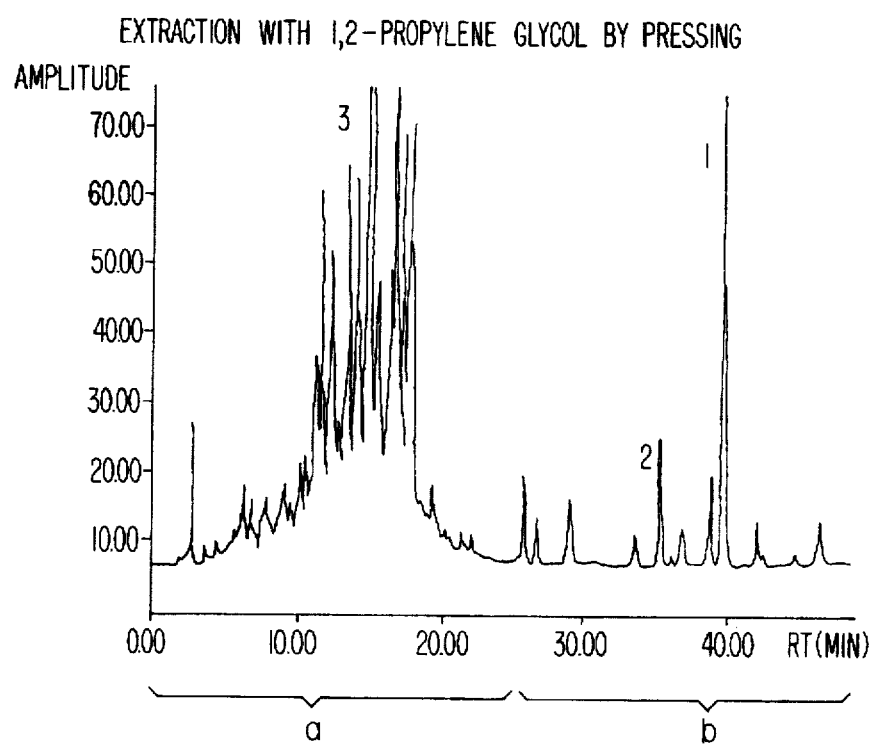

The spectrum given in FIG. 2 shows that the extraction with 1,2-propylene glycol by pressing enabled mainly water soluble antioxidants to be isolated ((a) FIG. 2) in addition to liposoluble antioxidants ((b) FIG. 2), while the spectrum given in FIG. 1 shows that the extraction with MCT by pressing enabled only the liposoluble antioxidants to be isolated ((b) FIG. 1). In point of fact, when antioxidants were extracted with 1,2-propylene glycol by pressing, the water-soluble antioxidant rosmarinic acid (3) was mainly isolated, in addition to the liposoluble antioxidants carnosol (2) and carnosic acid (1), and when antioxidants were extracted with MCT by pressing, mainly the liposoluble antioxidants carnosol (2) and carnosic acid (1) were isolated.

Various uses may then be considered for the antioxidant extracts obtained during one or other of the extractions. In order to protect a nutrient, cosmetic or pharmaceutical emulsion, use is preferably made of an extract of antioxidants obtained by extraction with 1,2-propylene glycol by pressing. On the other hand, to protect the lipid phase of a nutrient, a cosmetic product or a pharmaceutical product, use may either be made of an extract of antioxidants obtained by extraction with MCT by pressing or an extract of antioxidants obtained by extraction with 1,2-propylene glycol, by pressing.

Examples 6-11

50 g of 1,2-propylene glycol were added to 100 g of dried, chopped and unstripped starting vegetable matter. The whole was left with stirring for 60 min at room temperature.

The mixture was pressed in a piston press of the CARVER type at 500 bar for 60 min.

A clear liquid was collected containing antioxidants. The RANCIMAT test at 110° C., either in chicken fat, or in maize oil and the oxygen electrode method at 30° C. in maize oil gave the antioxidant power in the form of the induction indices shown in table 2.

In examples 6-11, rosemary, sage, thyme, marjoram, a cocktail of spices (containing 40% rosemary, 20% sage, 20% thyme and 20% marjoram) and cloves, respectively, were used as the starting vegetable matter.

TABLE 2

For the RANCIMAT test, measurements were carried out in the presence of 1% of extract, either based on maize oil, or based on chicken fat. For the oxygen electrode test, measurements were carried out in the presence of 1% of extract based on the maize oil contained in the emulsion.

| | | RANCIMAT Test/110° C. | | Oxygen electrode test/30° C. |
|---|---|---|---|---|
| Example | Extract | Chicken fat | Maize oil | Maize oil |
| 6 | Rosemary | 8.9 | 1.7 | 32 |
| 7 | Sage | 6.8 | 1.5 | 19 |
| 8 | Thyme | 5.2 | 1.2 | 8.4 |
| 9 | Marjoram | 2.8 | 1.1 | 7 |
| 10 | Cocktail of spices | 7.2 | 1.4 | 27 |
| 11 | Cloves | 2 | 1 | 13 |

Measurements of antioxidant power, given in the form of an induction index in the oxygen electrode test, demonstrated the quality and oxidative stability of the antioxidant compounds in emulsion, compared with the results obtained in an oil in the RANCIMAT oxidation test.

It was quite surprising to obtain an induction index in emulsion which was much greater than that obtained in the oil.

Examples 12–14

100 g of 1,2-propylene glycol were added to 100 g of dried, chopped and stripped vegetable matter. The whole was left with stirring for 60 min at 80° C.

The mixture was pressed in a piston press of the CARVER type, at 500 bar for 60 min.

A clear liquid was collected containing antioxidants. The RANCIMAT test at 110° C. in chicken fat and the oxygen electrode method at 30° C. in maize oil gave the antioxidant power in the form of the induction indices shown in table 3.

TABLE 3

For the RANCIMAT test, measurements were carried out in the presence of 10% of extract based on chicken fat. For the oxygen electrode test, measurements were carried out in the presence of 1% of extract based on the maize oil contained in the emulsion.

| Example | Extract | RANCIMAT test/110° C. Chicken fat | Oxygen electrode/30° C. Maize oil |
|---|---|---|---|
| 12 | Roasted coffee | 2.7 | 3.3 |
| 13 | Potato peelings | 2.6 | 2 |
| 14 | Dried tomato skins | 2 | 1.2 |

Example 15

50 g of dried, chopped and unstripped rosemary leaves were humidified with 5 g of water, and 50 g of MCT having $C_8$–$C_{10}$ were then added. The whole was then left for 60 min at 80° C.

The mixture was pressed in a piston press of the CARVER type, at 500 bar for 60 min.

A clear liquid was collected containing part of the antioxidants.

High performance liquid chromatography (HPLC) measurements enabled the various antioxidant extracts to be quantified. The RANCIMAT test at 110° C., either in chicken fat, or in maize oil and the oxygen electrode method at 30° C. in maize oil gave the antioxidant power in the form of induction indices.

All these measurements are shown in table 4.

A second extraction was then carried out on the cake from the first pressing with 1,2-propylene glycol. 54 g of 1,2-propylene glycol were added to 54 g of cake. The whole was left with stirring for 60 min at 80° C.

The mixture was pressed in a piston press of the CARVER type, at 500 bar for 60 min.

A clear liquid was obtained containing antioxidants. The same measurements were carried out as in the first stage. The results of these measurements are shown in table 4.

TABLE 4

For the RANCIMAT test, measurements were carried out in the presence of 1% of extract, either based on maize oil, or based on chicken fat. For the oxygen electrode test, measurements were carried out in the presence of 1% of extract based on the maize oil contained in the emulsion.

| | | HPLC % | | | RANCIMAT test/110° C. | | Oxygen electrode/30° C. |
|---|---|---|---|---|---|---|---|
| | | Rosm. acid | Carn. | Carn. acid | Chicken fat | Maize oil | Maize oil |
| Example 15 | Rosemary/ MCT | — | 0.29 | 1.9 | 11.4 | 1.7 | 2.8 |
| | Cake/ PG | 0.97 | 0.16 | 0.45 | 4.3 | 1.2 | 4.2 |

Rosm. acid: rosmarinic acid
carn. acid: carnosic acid
carn.: carnosol
—: not detected HPLC measurements enabled the various antioxidant compounds to be quantified which were extracted during the first extraction with MCT on dried, chopped and unstripped rosemary leaves, and during the second extraction with 1,2-propylene glycol on the cake.

The first extraction of antioxidants from rosemary with MCT by pressing enabled carnosic acid and carnosol to be extracted preferentially.

The second extraction with 1,2-propylene glycol by pressing on the cake enabled mainly rosmarinic acid to be extracted.

Examples 16–18

100 g of dried, chopped and unstripped rosemary leaves were humidified with 10 g of water, and 100 g of an $C_2$–$C_4$ alkylene glycol were then added. The whole was then left for 60 min at 80° C.

The mixture was pressed in a piston press of the CARVER type, at 500 bar for 60 min.

A clear liquid was collected containing antioxidants. High performance liquid chromatography (HPLC) measurements enabled the various antioxidant compounds extracted to be quantified.

The RANCIMAT test at 110° C., either in chicken fat, or in maize oil and the oxygen electrode method at 30° C. in maize oil gave the antioxidant power in the form of induction indices.

All the results are shown in table 5.

In examples 16 to 18, glycol, 1,2-propylene glycol and 1,3-butylene glycol were used respectively as the vehicle.

TABLE 5

For the RANCIMAT test, measurements were carried out in the presence of 1% of extract, either based on maize oil, or based on chicken fat. For the oxygen electrode test, measurements were carried out in the presence of 1% of extract based on the maize oil contained in the emulsion.

| | | HPLC % | | | RANCIMAT test/ 110° C. | | Oxygen |
|---|---|---|---|---|---|---|---|
| Example | Vehicle | Rosm. acid | Carn. | Carn. acid | Chicken fat | Maize oil | electrode/30° C. Maize oil |
| 16 | Glycol | 1.24 | 0.32 | 1.27 | 7.4 | 1.5 | 30 |
| 17 | 1,2-propylene glycol | 0.96 | 0.26 | 1.96 | 12.4 | 1.7 | 18 |
| 18 | 1,3-butylene glycol | 0.66 | 0.2 | 1.94 | 11.3 | 1.8 | 7.6 |

Rosm. acid: rosmarinic acid
carn. acid: carnosic acid
carn.: carnosol

By using either glycol, 1,2-propylene glycol or 1,3-butylene glycol as the vehicle, during the extraction of the antioxidant compounds from rosemary by pressing, mainly rosmarinic acid and carnosic acid were extracted.

Examples 19-23

The procedure was as in examples 6 to 10.

A clear liquid was collected containing antioxidants. HPLC measurements were made, so as to identify and quantify the antioxidant compounds fractionated from the various extracts.
The results are shown in table 6.

TABLE 6

| | | HPLC % | | | | |
|---|---|---|---|---|---|---|
| Example | Extract | Rosm. acid | Carva-crol | Thymol | Carno-sol | Carn. acid |
| 19 | Rosemary | 1.36 | — | — | 0.6 | 2.18 |
| 20 | Sage | 1.03 | — | — | 0.78 | 1.03 |
| 21 | Thyme | 0.99 | — | 0.78 | — | — |
| 22 | Marjoram | 1.04 | 2.31 | 0.49 | — | — |
| 23 | Cocktail of spices | 1.26 | 0.52 | 0.17 | 0.68 | 0.77 |

Rosm. acid: rosmarinic acid
carn. acid: carnosic acid
—: not detected

It was surprising to note that for the starting vegetable matters above, a strong spectrum of antioxidant compounds was obtained after extraction with 1,2-propylene glycol by pressing according to the present invention.

Example 24

20 g of unstripped and ground rosemary were treated in the presence of 120 ml of water with 0.2 g of GLUCANEX enzyme, Novo) for 4 h at 40° C., at pH 4, and the residue was then filtered off and dried.

10 g of 1,2-propylene glycol were then added and the mixture was treated for 60 min at 100° C.

The mixture was pressed in a piston press of the CARVER type, at 500 bar for 60 min, and a clear liquid was collected containing 2.5% of antioxidants with a yield of 95% based on the 1,2-propylene glycol used.

Example 25

100 g of 1,2-propylene glycol were added to 100 g of dried, chopped and unstripped rosemary leaves. The whole was left with stirring for 60 min at 80° C.

The mixture was pressed in a piston press of the CARVER type, at 500 bar for 60 min.

A clear liquid was collected containing antioxidants.

A second extraction was then carried out with 1,2-propylene glycol, in the manner described above in the same proportions, on a new charge of vegetable matter in the presence of the clear liquid collected during the first extraction.

A clear liquid was collected, enriched in antioxidants.

We claim:

1. A process for obtaining antioxidants from vegetable matter comprising mixing a $C_2$-$C_6$ alkylene glycol with vegetable matter which contains antioxidant substances and which has a water content, by weight, of from 5% to 30% to obtain a mixture and pressing the mixture to subject the mixture to a pressure of at least 40 bar to obtain from the vegetable matter a liquid extract containing antioxidant substances.

2. A process according to claim 1 wherein the alkylene glycol is selected from the group consisting of glycol, 1,2-propylene glycol and 1,3-butylene glycol.

3. A process according to claim 1 or 2 wherein the vegetable matter is a spice.

4. A process according to claim 3 wherein the spice is selected from the group consisting of rosemary, sage, thyme, marjoram and clove.

5. A process according to claim 3 wherein the spice is rosemary.

6. A process according to claim 1 or 2 wherein the vegetable matter is plant matter selected from the group consisting of green tea, coffee, potato peelings and tomato skins.

7. A process according to claim 1 or 2 wherein the vegetable matter is green tea.

8. A process according to claim 1 further comprising filtering the extract.

9. A process according to claim 1 wherein the alkylene glycol and the vegetable matter are mixed at a temperature of from 70° C. to 100° C.

10. A process according to claim 1 wherein the alkylene glycol and the vegetable matter are mixed at room temperature.

11. A process according to claim 1 or 10 further comprising, prior to mixing, steam stripping the vegetable matter to remove odorous substances from the vegetable matter to obtain odor-stripped vegetable matter and wherein the vegetable matter mixed with the alkylene glycol is the odor-stripped vegetable matter.

12. A process according to claim 1 wherein the alkylene glycol and vegetable matter are mixed in amounts to obtain a ratio by weight of the alkylene glycol to the vegetable matter of from 0.5 to 2.

13. A process according to claim 1 further comprising, prior to mixing, pressing a mixture of vegetable matter containing antioxidant substances and of medium chain triglycerides ("MCT") to obtain a liposoluble-antioxidant-substance-containing extract and a vegetable matter cake and wherein the vegetable matter mixed with the alkylene glycol is the cake vegetable matter.

14. A process according to claim 13 wherein the MCT have an average chain length of from $C_6$–$C_{12}$.

15. A process according to claim 13 wherein the vegetable matter is rosemary.

16. A process according to claim 1 further comprising, prior to mixing, incubating vegetable matter containing anti-oxidant substances with a glucanase in an aqueous medium to obtain incubated vegetable matter in the aqueous medium, separating the incubated vegetable matter from the aqueous medium by means selected from the group consisting of filtering and centrifuging to obtain separated vegetable matter, and then drying the separated vegetable matter to obtain glucanase-treated vegetable matter and wherein the vegetable matter mixed with the alkylene glycol is the glucanase-treated vegetable matter.

17. A process according to claim 16 wherein the vegetable matter is rosemary.

18. A process according to claim 1 or 8 further comprising collecting the extract to obtain collected extract, mixing the collected extract with further vegetable matter which contains antioxidant substances and which has a water content of from 5% to 30% and with a $C_2$–$C_6$ alkylene glycol to obtain a further mixture and pressing the further mixture to subject the further mixture to a pressure of at least 40 bar to obtain a further liquid extract containing antioxidant substances.

* * * * *